March 12, 1940.                J. B. RUSH ET AL                2,193,647
                                  BED TRAY
                            Filed April 5, 1937              6 Sheets-Sheet 1

Inventors
Jay B. Rush
Julius A. Mahr
Charles H. Decker
By Williamson & Williamson
Attorneys March 12, 1940. J. B. RUSH ET AL 2,193,647
BED TRAY
Filed April 5, 1937 6 Sheets-Sheet 4

Inventors
Jay B. Rush
Julius A. Mahr
Charles H. Decker
By Williamson & Williamson
Attorneys March 12, 1940.         J. B. RUSH ET AL         2,193,647
BED TRAY
Filed April 5, 1937         6 Sheets-Sheet 5
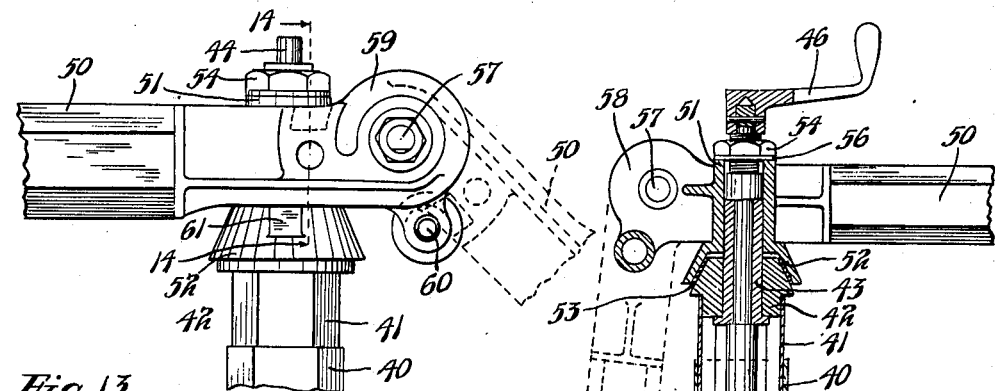
Fig. 13.
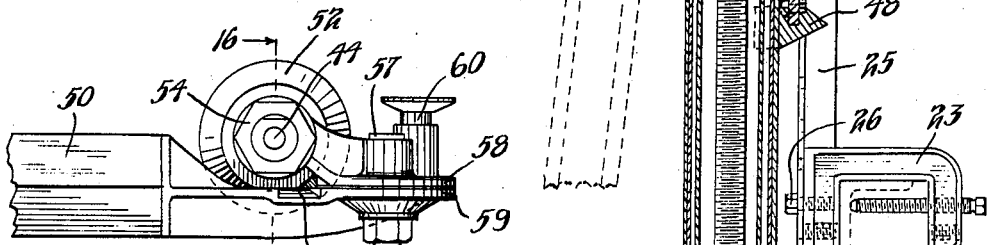
Fig. 15.
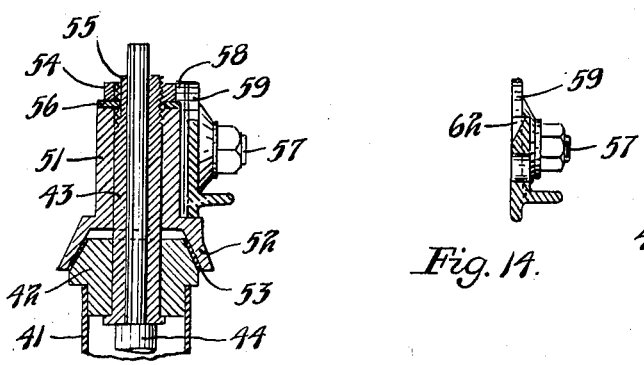
Fig. 16.
Fig. 14.
Fig. 12.
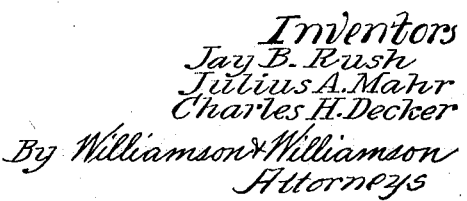
Inventors
Jay B. Rush
Julius A. Mahr
Charles H. Decker
By Williamson & Williamson
Attorneys

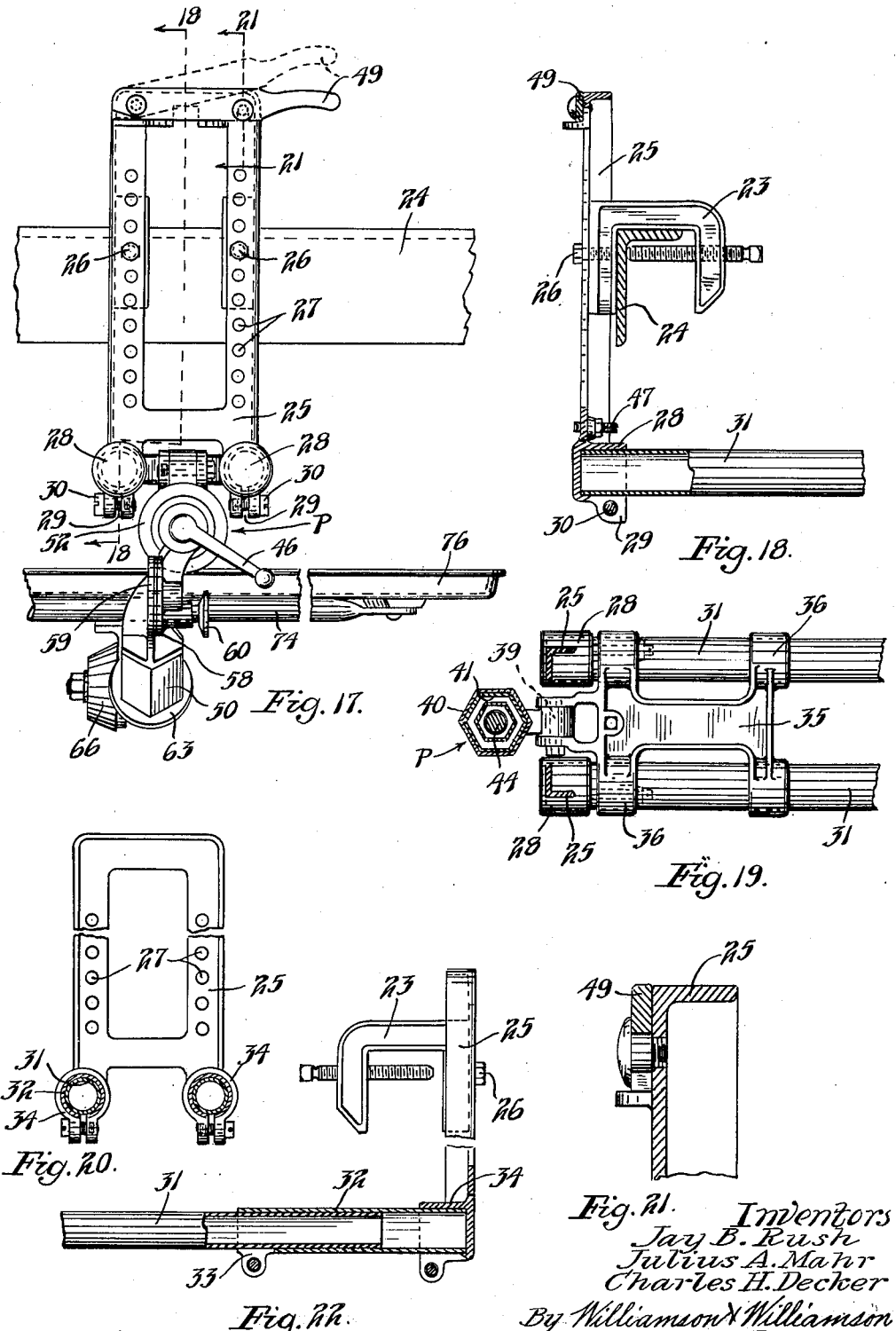

Patented Mar. 12, 1940

2,193,647

UNITED STATES PATENT OFFICE 2,193,647

BED TRAY

Jay B. Rush, Julius A. Mahr, and Charles H. Decker, Minneapolis, Minn.; said Mahr assignor to said Rush Application April 5, 1937, Serial No. 135,090

3 Claims. (Cl. 311—27)

This invention relates to article supporting devices and more particularly to devices of a type which are adaptable for use in connection with hospital beds and the like.

When persons are confined to bed for a considerable period of time, it is extremely advantageous to provide some means for holding plates, cups and saucers, silverware and the like while the patient is eating and also to provide means for holding books and magazines which may be used by a patient while sitting or lying in bed.

It is further an object of my invention to provide such an article holding and supporting means which may be adjusted to almost any number of positions for various uses and still not require the use of any complicated or unattractive supporting structure.

It is further an object of my invention to provide an article supporting device which can be easily adjusted to various positions, as stated above, and can also be quickly and simply locked in at least one desired position, such as in a horizontal position where it is absolutely necessary that the supported element be horizontal to prevent the spilling of food.

It is further an object of my invention to provide an article supporting device which can be very quickly and easily placed out of sight and out of the way when not in use, and still be maintained in such condition that it can be almost instantaneously set up in operative position.

These and further objects and advantages of the invention will more fully appear from the following description made in connection with the accompanying drawings, wherein like reference characters refer to similar parts throughout the views, and, in which—

Fig. 12 is a vertical section through the vertical main supporting post with the upper horizontal supporting post shown in a partially knocked down position in dotted lines;

Fig. 13 is a side elevation of the upper pivot construction on the main supporting post shown in Fig. 12;

Fig. 14 is a vertical section taken on the line 14—14 of Fig. 13;

Fig. 15 is a plan view of the pivot assembly shown in Fig. 12;

Fig. 16 is a vertical section taken on the line 16—16 of Fig. 15;

Fig. 17 is a side elevation of the assembly for clamping the device to the rail of a bed and also shows the tray and its supporting elements in fully collapsed position beneath the bed rail;

Fig. 18 is a section taken on the line 18—18 of Fig. 17;

Fig. 19 is a plan view of the tray supporting spline element shown mounted upon the ends of a tubular trackway;

Fig. 20 is a partial rear view of the clamp frame;

Fig. 21 is a section taken on the line 21—21 of Fig. 17; and

Fig. 22 is a fragmentary section of the telescoping spline supporting trackway.

Figure 1:
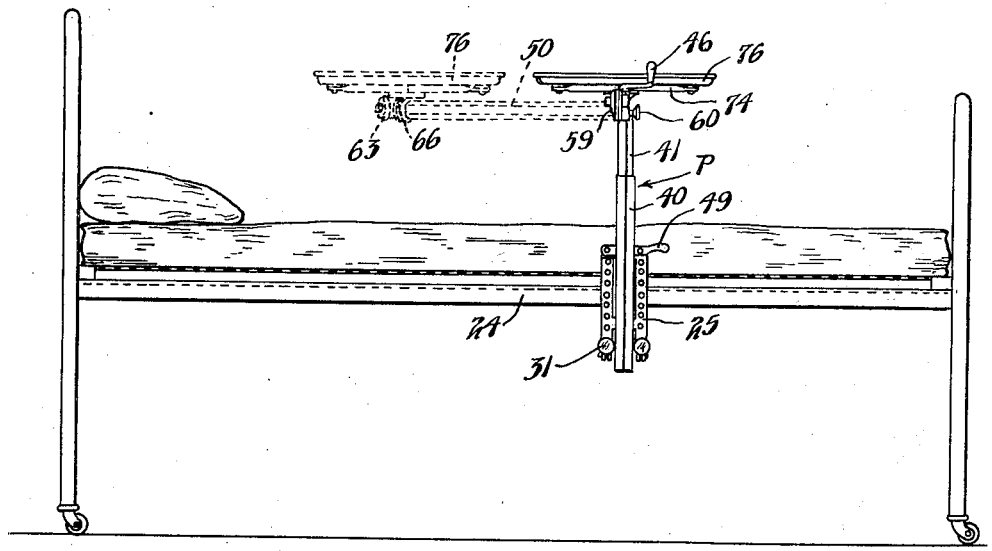
Fig. 1 is a side elevation of a bed with my invention applied showing a secondary position of the supporting apparatus in dotted lines.

Referring to the drawings in more detail, the device includes a pair of clamp members 23 which may be secured at opposite sides of a bed to the bed rails 24. These clamp members include vertically positioned frames 25 to which the clamps 23 are secured by bolts 26 which may be inserted in any one of the plurality of openings 27 for vertical adjustment. The lower ends of the clamp frame members are provided with a pair of sockets 28 which are slit as at 29 and provided with bolts 30 for tightening them so that they will clamp around the ends of the tubular track members 31 which extend transversely of the bed and whose opposite ends are slidably mounted in tube sections 32 which are provided with split portions and adapted to be tightened, as shown generally at 33. The opposite ends of the split of the tubular sections are secured in sockets 34 similar to the sockets 28 described above. Thus the device may be adjusted for various widths of beds and the set screws in the clamps 23 may be positioned differently to permit them to be clamped to round bed rails.

A slide element 35 is provided with rounded sleeve-like slide members 36 which are adapted to slide upon the bars 31 which form the transverse trackway. A stop 37 is provided at the lower portion of the left-hand clamp frame and a set screw 38 is mounted upon the slide member 35 to govern the extent of movement of the slide member toward the left-hand ends of the trackway.

The slide member 35 is provided with a horizontal pivot construction 39 at its left-hand end and connects with the lower telescoping portion of the main vertical supporting post indicated generally by the latter P. This supporting post includes a double walled lower section 40 which is adapted to receive between its walls from the upper end a co-operating telescoping post element 41. The upper post element 41 carries a plug 42 in which is journaled in a bearing 43 the upper end of a vertical adjustment rod 44. The rod 44 is threaded throughout most of its length as shown in Fig. 12, for threadedly engaging the closed upper end 45 of the inner wall portion of the lower telescoping element. The threaded rod 44 is provided at its upper end with a crank handle 46 which may be used to rotate the threaded adjustment element 44 to raise or lower the upper telescoping post section 41 with respect to the lower post section. As shown in Fig. 12, an adjustable stop 47 is provided adjacent the lower pivot point of the supporting post P to limit the movement of said post when it is swung upward to a vertical position. Figs. 12 and 17 show a catch member for retaining the post in its vertical position which includes a notched element 48 secured to the vertical post and a pivoted catch 49 which is adapted to rest in the notch to hold the post assembly rigidly in a vertical position.

A horizontal tray supporting arm 50 which is preferably of tubular construction similar to the elements making up the vertical post P is provided with a sleeve 51 which surrounds the bearing 43 around the upper portion of the threaded member 44. The sleeve 51 is provided at its lower end with a flaring skirt 52 which is adapted to fit over a cooperating similarly pitched surface on the peripheral face of the plug 42, as shown in Figs. 12 and 16. Between the flared skirt 52 and the slanted face of the plug 42 is inserted a, preferably fibrous, friction element 53. A nut 54 at the upper end of the sleeve 51 is threadedly secured to the upper threaded portion of the sleeve 43 and this threaded portion is provided with a flat area 55, as best shown in Fig. 16 so that the washer 56 will not rotate when the nut is threaded. Tightening the nut 54 will increase the pressure on the friction element 53 to any desired degree whereby the horizontal arm 50 can be turned to a desired position and retained frictionally in that position.

Figure 2:
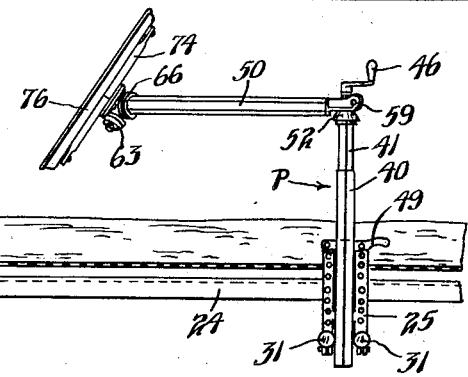
Fig. 2 is a partial side elevation of a bed showing the tray element of my invention at approximately a 45 degree angle.
Figure 3:
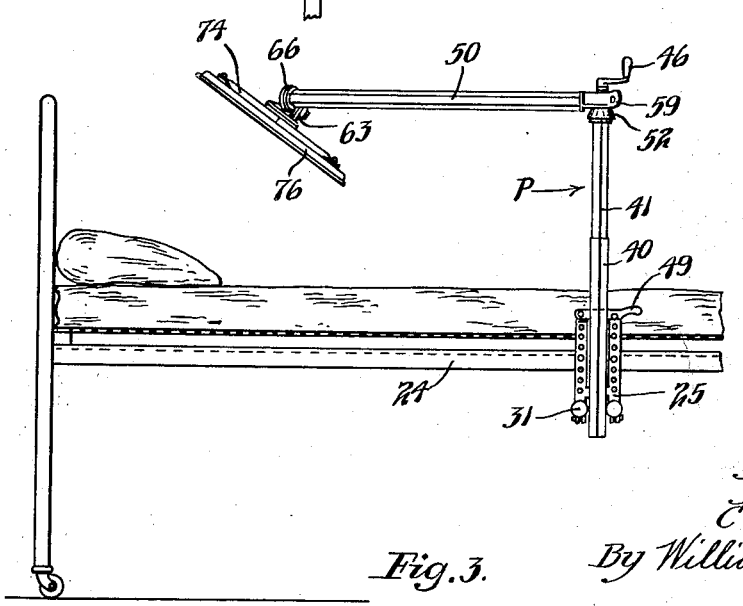
Fig. 3 is a partial side elevation similar to Fig. 2, except that the tray is tilted at an angle opposite to that shown in Fig. 2.

A horizontal pivot is interposed between the vertical sleeve 51 and the end of the horizontal arm 50. This horizontal pivot includes a pin 57 and cooperating flat elements 58 and 59 as shown in Fig. 15. The flat element 58 carries a sliding catch member 60 which rests in an opening in said flat element 58 and normally bears against the inner flat face of the element 59 under spring pressure. When the arm 50 is in the position shown in full lines in Figs. 12, 13 and 15 and in the position shown in the general views, Figs. 1, 2, and 3, the arm merely rests by gravity upon an abutment 61, best shown in Fig. 13. However, when the arm 50 is swung over on its horizontal pivot and downwardly to the dotted line position indicated in Fig. 13, the spring catch 60 will engage a detent 62 which is formed in the end of the bar 50, as shown in Fig. 15, and lock said horizontal bar 50 in the dotted line position indicated in Fig. 12, by slipping into the opening 62a.

Figure 7:
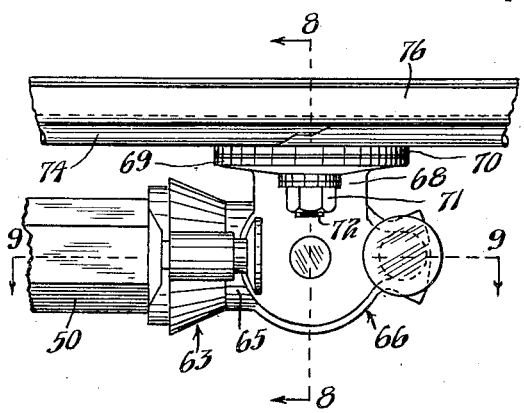
Fig. 7 is an enlarged fragmentary side elevation of the pivotally adjustable tray supporting elements.
Figure 8:
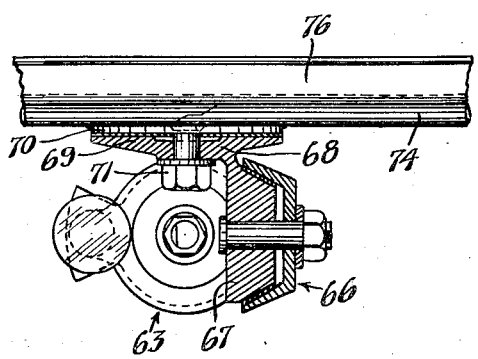
Fig. 8 is a vertical section of the parts shown in Fig. 7 taken on the line 8—8 of Fig. 7.
Figure 9:
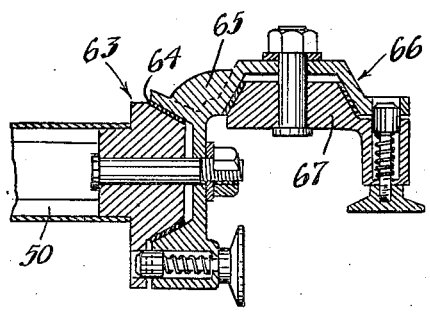
Fig. 9 is a horizontal section taken on the line 9—9 of Fig. 7.
Figure 10:
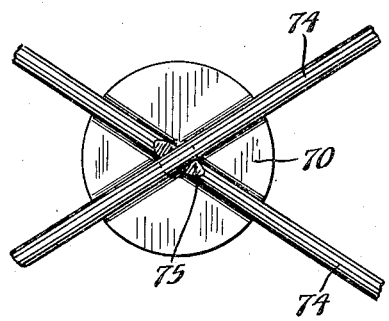
Fig. 10 is a fragmentary bottom plan of the closed tray supporting bar elements.

The outer end of the tray supporting bar 50 is provided with a frictional pivot construction similar to the frictional pivot described in connection with the flared skirt 52, similarly shaped plug 42 and friction element 53 and is also provided with a spring catch including a spring pressed pin and detent, as shown in Fig. 9. In this particular instance, the pivot construction is generally indicated by the numeral 63 in Figs. 7, 8 and 9. The flared skirt portion 64 of the friction pivot 63 is integrally formed with a substantially right angled element 65 which carries on its opposite arm a friction pivot construction indicated generally by the numeral 66, the axes of the pivots 63 and 66 being disposed at right angles to each other and the spring catch on the pivot 63 being so positioned that when it is in locked position, the axis of the pivot 66 will be firmly retained in a horizontal position. The inner tapered portion 67 of the pivot 66 is provided with an extension 68, as shown in Figs. 7 and 8, to connect with a disc-like detachable plate 69 which cooperates with the disc 70 to form a frictional pivot having a friction material interposed between the two plates in the same general manner as the other pivots previously described. It will be noted in Fig. 8 that the disc 69 is recessed at its center on its upper side so that frictional contact will be more or less spread around the outer portion of said plates 69 and 70 when the adjusting nut 71 is tightened.

Figure 6:
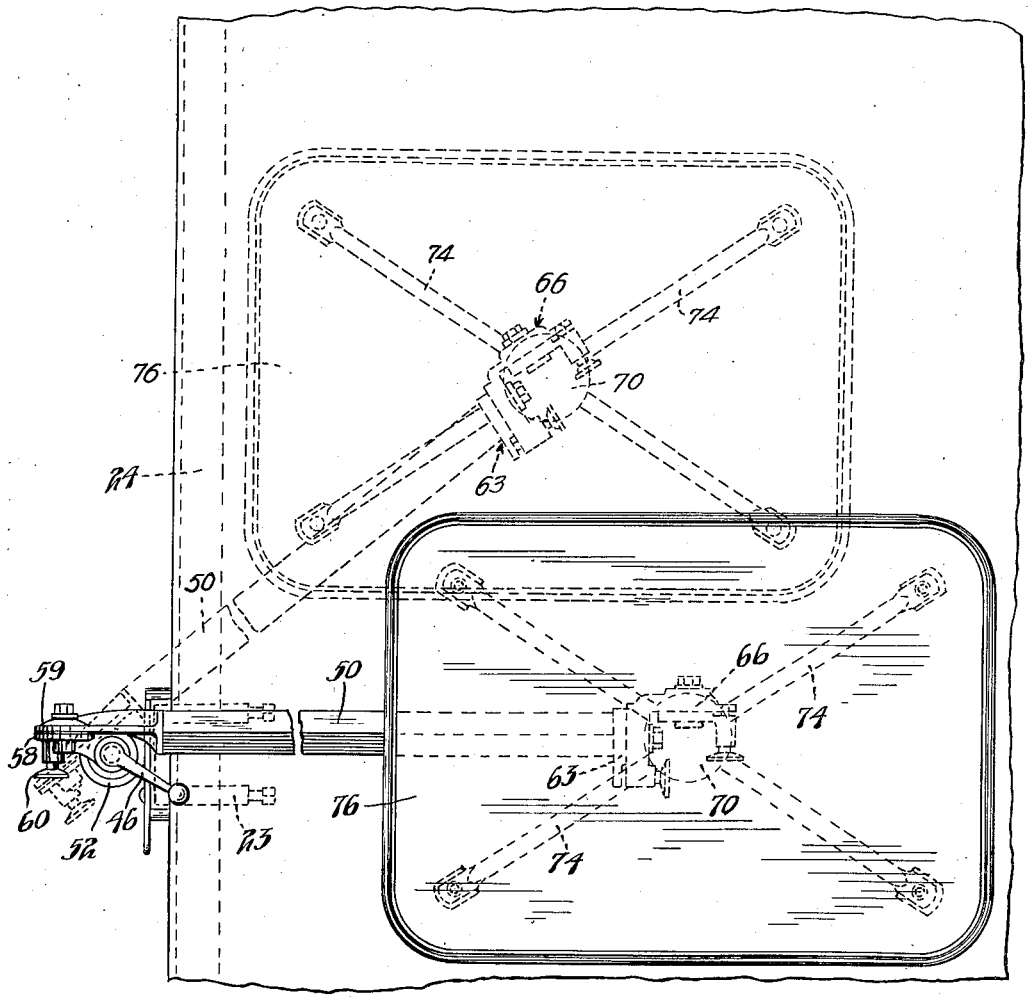
Fig. 6 is a top plan view with a portion of a bed shown and a dotted line showing of an alternate position of the tray and supporting structure.
Figure 11:
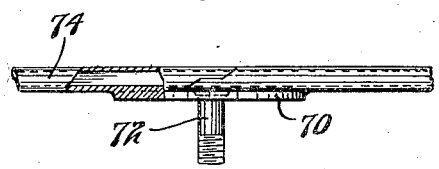
Fig. 11 is a partially broken away fragmentary side elevation of the tray supporting parts shown in Fig. 10.

The adjusting nut 71 is threaded upon the short bolt 72 which is best shown in Fig. 11 and this bolt is rigidly secured to the disc-like element 70. The disc 70 carries a pair of crossed rods 74 which have cut away central posts 75 at the point where the rods cross so that the upper lines of said rods are on the same level. These rods extend to points adjacent the four corners of a tray 76, as best shown in Fig. 6. The outer ends of the cross rods 74 are preferably secured to the tray by some form of attaching means which does not extend entirely through to the upper surface of the tray. This attachment is not shown in detail but may include downwardly extending bosses which are integral with the tray body and which have small bolts whose heads are embedded in the bosses. If this type of attachment is used, the ends of the rods are apertured to receive the bolts, and nuts are threaded upon the bolts to firmly secure the tray to the rods.

In operation, when it is desired to secure the device to a bed, the telescoping rods 31 which form the trackway are set according to the width of the particular bed by first placing the left-hand ends of the rods in the sockets 28 which are a part of the left-hand clamping frame. The right-hand clamps 23 are then placed upon the right-hand bed frame and the outer sleeve 32 which telescopes upon the rods 31 is moved until its end fits in the socket 34 at the right-hand side of the bed and then all clamping elements tightened. It is to be understood that the clamps 23 may be made in various forms and I have indicated at 23' an extra set of threaded openings in the clamp 23 whereby the clamping bolt may be moved downwardly so that it will better engage the bed in the case of a round bed frame. Of course, the clamp and the clamp frame 25 may be adjusted relative to each other by changing the position of the bolts 26 to one of the aligned openings 27.

After the cross rods 31 and clamps have been applied, the slide member 35 can then be moved from one side of the bed to the other on said rods. When it is drawn to the left-hand end of the rods, the stop formed by the adjustable bolt 38 and abutment surface 37 on the socket 28 will limit movement of said slide and the main post P with its attached tray supporting arm 50 and the tray itself. At this point, the main post P will be swung from the horizontal position indicated in Fig. 5 (except that the post and slide will be moved as far left as the slide can travel) upon its pivotal connection with the slide 35 and will be brought up to the vertical position shown in Fig. 4, the lock formed by the catch elements 48 and 49 retaining the post P in vertical position.

All of this operation after the clamps have been initially secured in a relatively permanent position requires only a very little time and is an extremely simple operation. It is only necessary to draw the main post P outwardly from under the bed, swing it up where it will catch, and then release and swing over the tray supporting arm 50.

After the tray has been set up, the arm 50 can be swung on its vertical pivot to any desired position, as suggested in Fig. 6. After the tray supporting arm has been swung to put the tray to a desired position with respect to the person occupying the bed, the tray may be left in its locked horizontal position as set forth in the detailed description or this lock may be released and the tray tilted at any desired angle due to the universally disposed pivots at the outer end of the trap supporting arm 50. It will be remembered that these pivots are provided with friction elements which may be clamped to any desired degree of tightness, so that the tray will remain relatively rigid in the position to which it is moved. Thereafter, if it is desired to return the tray to its horizontal locked position for the serving of food and the like, it is a simple matter to swing it upon its universal mounting to the horizontal position where it will be automatically locked by the spring pin locking elements associated with each of the horizontal pivots forming the universal joint. When in this horizontal locked position, the tray may still be rotated on its vertical supporting pivot bolt 71 without opening the locks on the horizontal pivots.

Figure 4:
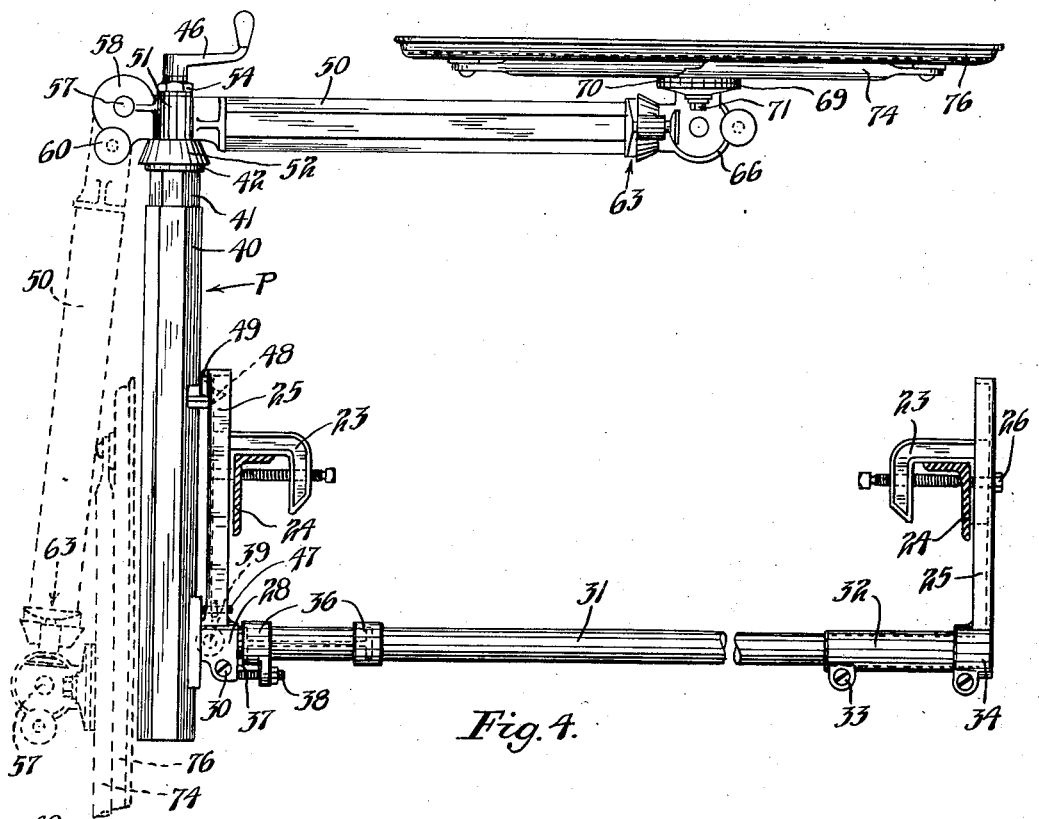
Fig. 4 is an end elevation of the tray and supporting device with the side rails of a bed shown in cross section and a partial dotted line showing of my structure in one of the positions assumed in collapsing it.
Figure 5:
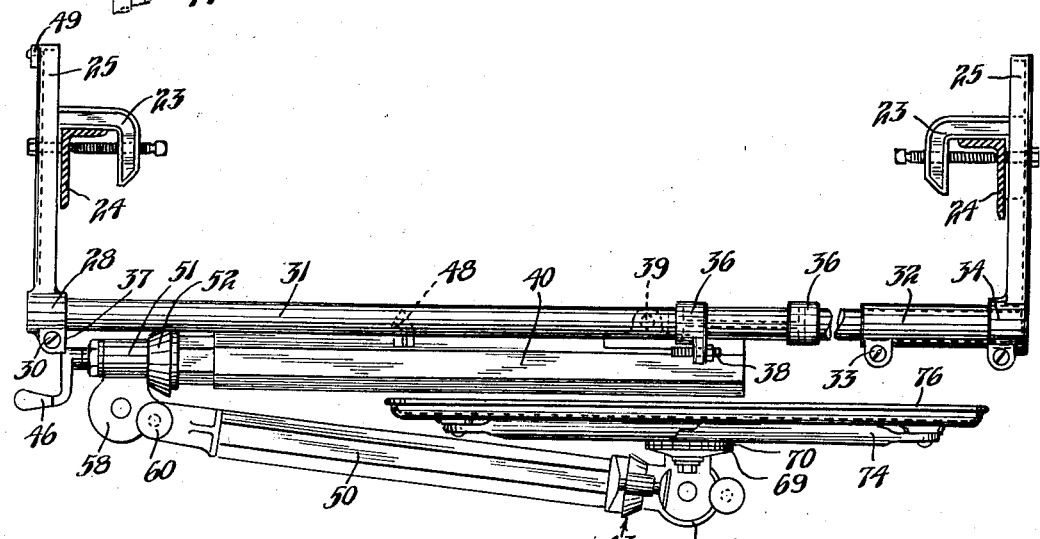
Fig. 5 is an end elevation showing the apparatus in completely collapsed position.

To replace the tray beneath the bed out of sight, it is necessary only to swing the tray supporting arm 50 over and down to the dotted line position shown in Fig. 4, where it will be automatically locked in place, then to release the catch element 49 holding the main supporting post P and then swing the post P to a horizontal position and push it under the bed on its slide 35.

From the foregoing, it will be seen that we have provided an article supporting structure particularly adaptable for beds and the like, which may be quickly and easily set into position and just as easily and quickly placed out of the way beneath the bed where it cannot be seen and is not likely to catch any dirt or dust. Furthermore, the extreme flexibility of the device makes it adaptable to many uses. Food may be eaten from it in its horizontal position, it may be tilted to the angle shown in Fig. 2 for writing or reading a book, and if the person is lying upon his back, it may be tilted to the position shown in Fig. 3, and a newspaper or magazine may be secured thereto by merely snapping one or two rubber bands around the reading matter and the tray. This will provide a support which does not necessitate holding the article in the hand.

In addition to the various positions to which the tray can be set as described, its height above the bed is, of course, readily adjustable due to the telescoping action of the main post P. This is accomplished as is readily seen by rotating the crank 46 in the direction desired to either elevate or lower the horizontal arm 50 and the tray which is secured thereto.

It will, of course, be understood that various changes may be made in the form, details, arrangement and proportions of the various parts without departing from the scope of our invention.

What is claimed is:

1. In an article supporting structure for beds and the like, a trackway extending transversely beneath the bed above the floor, a slide member on said trackway, a post pivotally secured to said slide and adapted to swing from a horizontal to a vertical position beside the bed in a plane transversely of the bed, an arm connected to said post by vertically axial pivot means whereby said arm can be swung over said bed, means permitting said arm to swing on a horizontal axis in a plane transversely of the bed, and an article supporting element mounted for universal movement upon said arm.

2. In an article supporting structure for beds and the like, a trackway supported by the side frames of the bed, comprising a pair of rigidly mounted tubular elements composed of adjustable telescoping sections, a slide member slidably mounted upon said tubular members, a post member pivotally secured to said slide member and adapted to swing from a horizontal to a vertical position at the edge of the bed, a tray, and means pivotally connecting said post to said tray.

3. In an article supporting structure for beds and the like, a trackway extending beneath the bed above the floor, a slide member on said trackway, a post pivotally secured to said slide and adapted to swing from a horizontal into a vertical position beside the bed in a plane substantially coincident with the longitudinal axis of said trackway, an arm connected to said post by vertically axial pivot means whereby said arm can be swung over said bed in a plane parallel to the upper surface of the bed, and an article supporting element mounted upon said arm.

JAY B. RUSH.
JULIUS A. MAHR.
CHARLES H. DECKER.